United States Patent [19]

Hiniker

[11] 3,896,610

[45] July 29, 1975

[54] FLOATING SICKLE BAR MOWER

[76] Inventor: Kenneth S. Hiniker, P.O. Box 3044, Mankato, Minn. 56001

[22] Filed: Mar. 4, 1974

[21] Appl. No.: 447,738

[52] U.S. Cl................................ 56/15.8; 56/260
[51] Int. Cl............................................ A01d 55/26
[58] Field of Search ......... 56/15.8, 15.9, 10.2, 10.4, 56/257, 260, 158, 261

[56] References Cited
UNITED STATES PATENTS
3,813,859 6/1974 Fuller et al. .......................... 56/260

Primary Examiner—Louis G. Mancene
Assistant Examiner—J. N. Eskovitz
Attorney, Agent, or Firm—Merchant, Gould, Smith & Edell

[57] ABSTRACT

A floating mower for propulsion by a vehicle such as a combine, together with means for driving the sickle bar of the mower at its normal end connection from the normal power drive of the combine.

1 Claim, 5 Drawing Figures

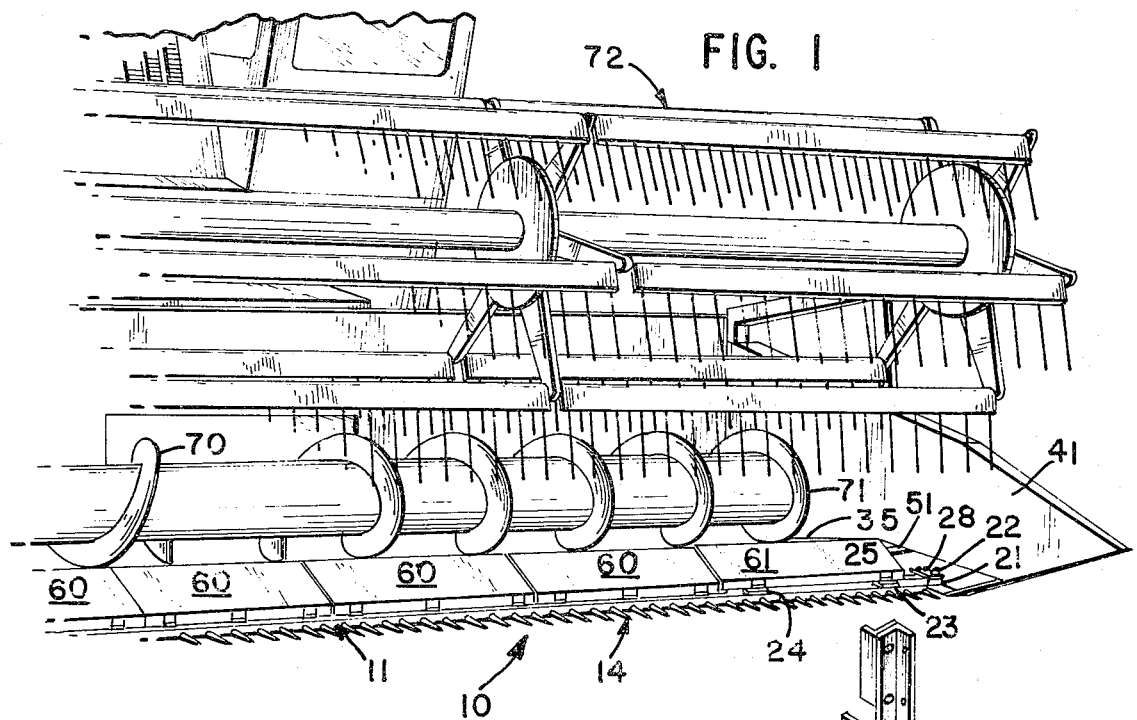
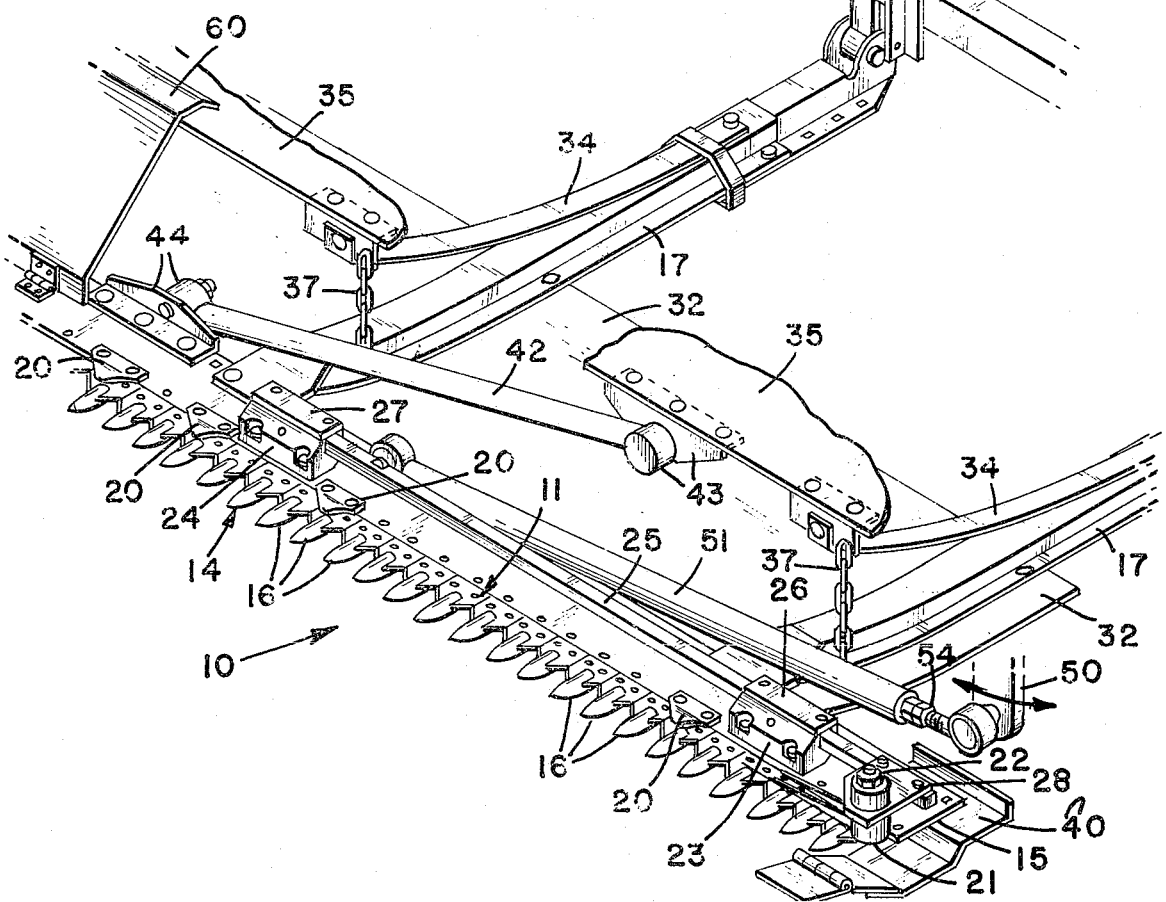

FLOATING SICKLE BAR MOWER

BACKGROUND OF THE INVENTION

This invention relates to the field of agricultural implements, and more particularly to mowers for use with implements such as combines. It is of course conventional for a combine to have a mower at the front of its header, for vertical adjustments by adjustment of the header. Power for driving the sickle bar of such a mower is applied at the end of the sickle bar, which is constructed accordingly.

In agricultural operations it sometimes becomes desirable however to bring the mower closer to the ground than is advisable with a mower unitary with the header, and in this situation a floating mower is used. Here the mower is generally supported on runners or skids which rest directly on the ground, and is propelled forward by a connection to the combine header which permits the skids to maintain ground contact, the vertical distance of the mower from the header varying with the terrain. Power for driving the sickle bar of such a mower may be obtained from the same drive on the combine, but it has been the practice to supply the floating mower complete with its own mower bar and guards, and its own sickle bar especially altered to cooperate with a power connection remote from its end.

SUMMARY OF THE INVENTION

It is the principal object of my invention to provide a floating mower for propulsion by an implement such as a combine, in which the operator may use the sickle bar from his combine itself, together with the guards, and so on, so that the expense of duplicating these members may be avoided. To this end a more specific object of the invention is to provide an improved arrangement for connecting a floating mower to a combine or other vehicle for propulsion and powering thereby, so arranged that the combine sickle bar may be used unaltered in the floating mower.

Various other objects, advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing:

FIG. 1 is a fragmentary elevational view of a combine including my invention;

FIG. 2 is a perspective fragmentary view of the invention, parts being removed for the sake of clarity;

DESCRIPTION OF THE PREFERRED EMBODIMENT

Figure 3:
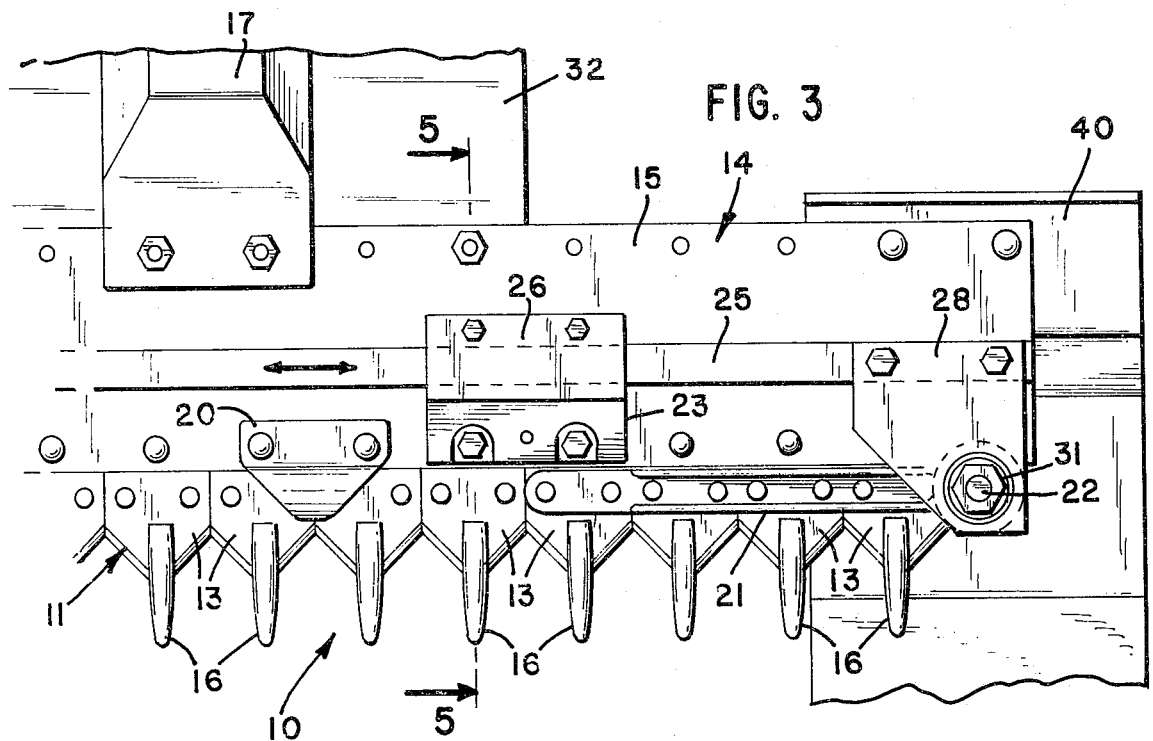
FIGS. 3 and 4 represent plan and front detailed views of the invention.
Figure 4:
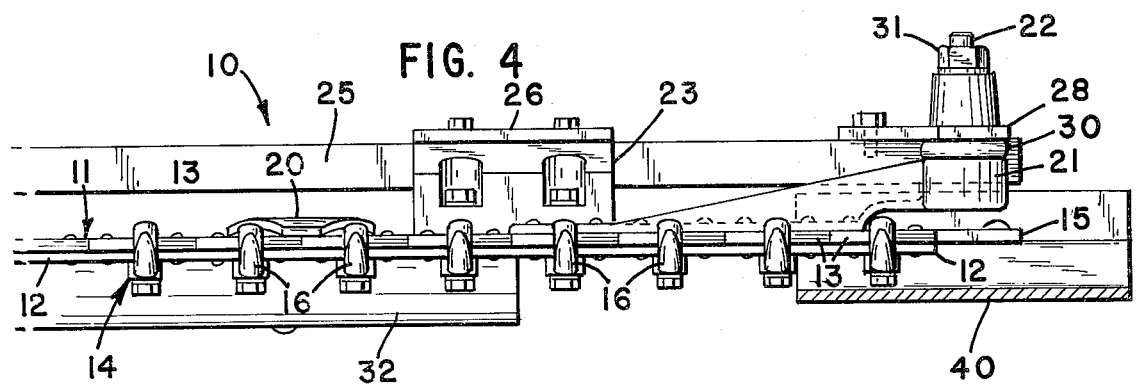
Figure 5:
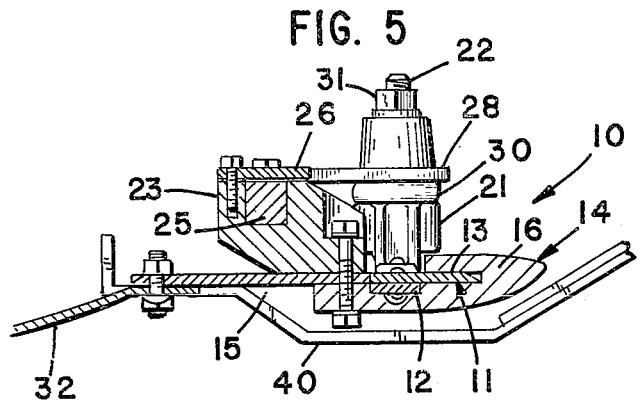
FIG. 5 is a section view along 5—5 of FIG. 3.

In the drawing my mower 10 is shown to include a sickle bar 11 comprising a bar 12 carrying a plurality of sickles 13 and a mower bar 14 comprising a bar 15 carrying a plurality of guards 16 through which the sickles move and against which they perform their reaping function. Mower bar 14 is supported on the front ends of a plurality of shoe frames 17 spaced along its length, and carries at its front edge a plurality of clips 20 which hold sickle bar 11 in place, while permitting its reciprocation relative to the mower bar. At its outer end sickle bar 11 carries a drive member 21 including an upwardly extending stub shaft 22.

Mower bar 15 carries a pair of spaced guide blocks 23 and 24 arranged to slidingly receive a link 25, which is held within the blocks by caps 26 and 27 respectively, and which is connected to stub shaft 22 by a member 28 traversed by shaft 22 and secured thereto by suitable means including a grease retainer 30 and a nut 31. Thus, any sliding of link 25 in blocks 23 and 24 is accompanied by like movement of sickle bar 11 with respect to mower bar 14.

Secured beneath shoe 17 is a shoe skid 32 which contacts the surface of the field being mowed and thus supports the weight of the mower. Shoes 17 may be of adjustable length: at their rear ends they are pivotally connected to shoe tails 33 which are secured to the body of the implement in any suitable fashion. The shoes carry forwardly projecting leaf springs 34 which are secured to a transverse member 35 referred to in a combine as a guard angle. Each spring and shoe are surrounded by an adjustable clamp which acts to transfer a portion of the mower weight resiliently to member 15 in proportion to the forward displacement of the clamp along the shoe. A short length of chain 37 extends from member 35 to each shoe 17, and is normally slack, but acts to set a limit to the downward travel of the mower under unfavorable ground conditions.

At each end mower bar 15 carries a support 40, only one being shown in the drawing. Secured to these supports and to the body of the implement are the wing dividers 41 (FIG. 1) which direct the crop to be mowed into the mower.

From the foregoing it will be evident that the mower is propelled forward by the shoes 17, which also permit limited, resilient vertical movement of the mower with respect to the implement. Lateral stability is given to the mower by a radius road 42 of fixed length pivotally connected to member 35 at 43, and to bar 15 at 44.

The method of causing reciprocating motion of the sickle bar with respect to the mower bar depends in detail on the construction of the implement to which my mower is to be attached. In one typical example the implement supplied power by transverse reciprocatory movement of a drive member 50 as suggested by the curved arrow in FIG. 2; other implements are known in which the reciprocation is in the horizontal rather than the vertical plane. In any case a pitman arm 51 is pivotally connected to drive member 50 at 52 and to link 25 at a point 53 between blocks 23 and 24: pitman arm 51 may have a length adjustment 54 if desired to insure proper centering of the sickles in the guards.

It is desirable to prevent weeds and other material from passing between the mower 10 and member 35: to this end I provide weed cover 60 (FIG. 1) hinged to mower bar 15 and rising to rest on member 35, and a drive cover 61 is similarly hinged to blocks 24 and 25.

The combination of my mower with a particular implement is suggested in FIG. 1, which shows mower 10, divider 41, covers 60 and 61, and the auger sections 70 and 71 of the implement itself. Where the implement is a combine, the entire assembly is the header 72 thereof, and the height of the header is adjusted by the operator in the usual fashion until the skids of the mower make contact of the desired force with the ground.

By this arrangement an uneven field may be harvested more evenly and more closely, the mower rising and falling with respect to the implement in accordance with ground conditions, within the limits set by the chains 37. It should be noticed that the axes of radius rod 42 and pitman arm 51 are substantially parallel, so that the former is able to resist the forces applied by the latter in any vertical position of the mower.

Numerous objects and advantages of my invention have been set forth in the foregoing description, together with details of the structure and function of the invention, and the novel features thereof are pointed out in the appended claims. The disclosure, however, is illustrative only, and changes may be made in detail especially in matters of shape, size and arrangement of parts, within the principle of the invention, to the full extent indicated by the broad general meaning of the terms in which the appended claims are expressed.

What is claimed is:

1. In a harvester having a frame, a drive member, and power means for causing transverse oscillatory motion of said drive member with respect to said frame:

a mower structure including a mower bar, a sickle bar having a driving connection at one end thereof and reciprocable with respect to said mower bar, and ground contacting means for normally supporting at least a portion of the weight of said structure;

means connecting said mower structure to said frame for propulsion therewith, while providing for limited generally vertical movement of said mower structure to effectuate said ground support, so that the distance between said drive member and said sickle bar is not constant;

a sliding link connected at one end to said driving connection of said sickle bar and extending along said mower bar;

spaced guide means carried by said mower bar and traversed by said sliding link;

a pitman arm pivotally connected at one end to said drive member;

and means pivotally connecting the other end of said pitman arm to said sliding link at a location between said guide means.

* * * * *